United States Patent [19]

Hausler et al.

[11] 4,200,907
[45] Apr. 29, 1980

[54] METHOD OF TAKING A POLE OF A HIGH-VOLTAGE D-C TRANSMISSION STATION OUT OF SERVICE

[75] Inventors: Michael Häusler; Kadry Sadek, both of Hirschberg, Fed. Rep. of Germany

[73] Assignee: Brown, Boveri & Cie Aktiengesellschaft, Mannheim, Fed. Rep. of Germany

[21] Appl. No.: 887,245

[22] Filed: Mar. 16, 1978

[30] Foreign Application Priority Data

Mar. 19, 1977 [DE] Fed. Rep. of Germany ....... 2712232

[51] Int. Cl.² ............................................. H02M 5/40
[52] U.S. Cl. ........................................ 363/35; 363/51
[58] Field of Search ...................... 363/35, 51, 52–54

[56] References Cited

U.S. PATENT DOCUMENTS

| | | | |
|---|---|---|---|
| 3,629,685 | 12/1971 | Johansson | 363/51 |
| 3,952,210 | 4/1976 | Kanngiesser | 363/35 X |
| 3,968,419 | 7/1976 | Ekstrom | 363/51 X |

FOREIGN PATENT DOCUMENTS 1151854 5/1969 United Kingdom .

OTHER PUBLICATIONS

Article from ETZ-A, vol. 89, No. 8/9, HGUe, pp. 4–10, 1968.
ETZ-A, vol. 97, No. 7, pp. 407–411, 1976.
Cigre', "Specification of HUDC Circuit-Breakers for Different System Applications", J. P. Bowles & L. Vaughan, 13–09, pp. 1–13, 1976.

*Primary Examiner*—William M. Shoop
*Attorney, Agent, or Firm*—Herbert L. Lerner

[57] ABSTRACT

Method of taking a pole of high-voltage d-c transmission system (HVDCTS) out of service, having a rectifier station connected to a first three-phase network and an inverter station connected to a second three-phase network, two d-c lines connected from one station to the other, each station being divided into halves, the station halves of each station being connected together on one side to a station center grounding electrode, the other side of each station being connectible to the positive d-c line so as to form a positive pole, and to the negative d-c line so as to form a negative pole, and residual-current switching means for taking a pole out of service, which includes grounding the station pole through a pole grounding switch which is spaced from the station center grounding electrode, and subsequently commutating a partial fault current of other poles, occurring from the pole being taken out of service, into the station center grounding electrode by the residual-current switch in the form of a circuit breaker.

2 Claims, 1 Drawing Figure

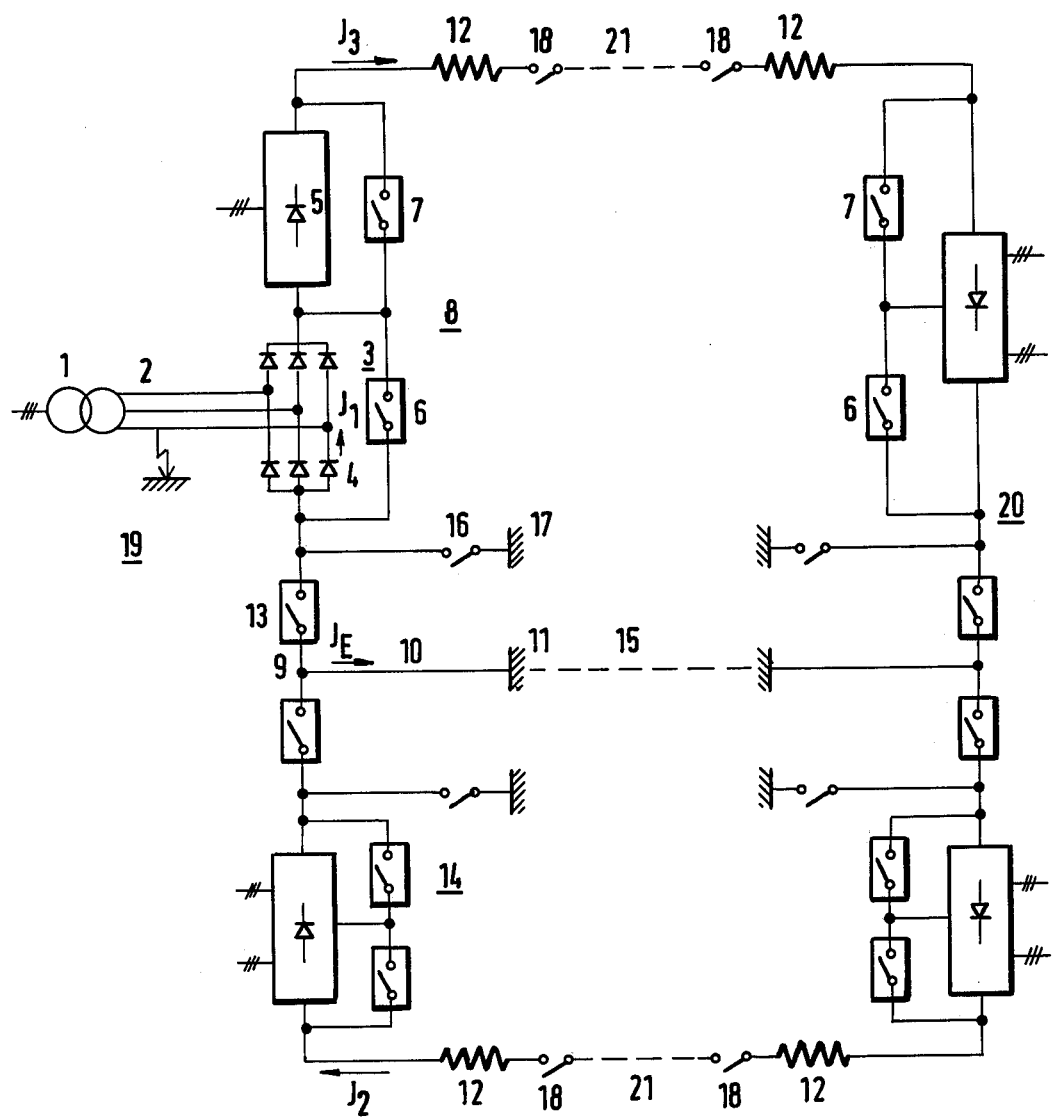

METHOD OF TAKING A POLE OF A HIGH-VOLTAGE D-C TRANSMISSION STATION OUT OF SERVICE

The invention relates to a method of taking a pole of a high-voltage d-c transmission system out of service, which includes a rectifier station connected to a first three-phase network and an inverter station connected to a second three-phase network and connected to the first station by two d-c lines. Each station is divided in half, the halves of each station being together connected to ground on one side. On the other side, each station half is connected to the positive d-c line, together forming the positive pole. Alternatively, the other side of each station half is connected to the negative d-c line, together forming the negative pole. The pole is taken out of service by means of a residual-current switch.

The above described construction of a high-voltage d-c transmission system is generally known from ETZ-A, vol. 89 (1968), no. 8/9, and especially in accordance with the Special Publication of the Working Group HGUe, page 4, ETZ-A, vol. 97 (1976), no. 7, page 408.

For maintenance or after a disturbance, a high-voltage d-c transmission system (HVDCTS) pole must be taken out of service without disturbing the operation of the other poles. To this end, the pole must be separated from the high-voltage line and from the common ground connection of all station poles. If the station pole which is to be taken out of service does not carry current, a disconnect switch can be used as the residual-current switch for cutting out the faulty pole. This condition of zero current in the HVDCTS pole at the instant of interruption, however, is not present in the case of disturbances which occur, for instance, in the ivent of a short to ground in the three-phase lead of a converter group near ground. If another operative pole is simultaneously not to be let down, even briefly, the latter will feed a partial fault current into the short to ground through the line of the pole which is to be disconnected.

It is generally known to employ a conventional three-phase power breaker as the residual-current switch for cutting out the faulty station pole and commutating the partial fault current to the station center grounding electrode. However, this procedure is limited by two conditions. Firstly, the ground electrode line must not contain appreciable inductances, and secondly, the smoothing chokes of the converters must not be disposed in the ground line. The limit of applicability of a three-phase power circuit breaker as the residual-current switch is reached if a parallel ground return path exists by way of closed bypass switches of the converter groups through the smoothing chokes and the high-voltage line to another HVDCTS station. In that case, the three-phase power breaker cannot be opened directly in order to cut off the pole because of the large inductance of the circuit to be cut off.

A similar problem exists if an existing ground connection is disconnected because of excessively large ground currents and the ground line of a pole which has failed is to be used as the return line. A HVDC load switch is conventionally used for solving this problem, as disclosed in: Specification of HVDC circuit breakers for different system applications, J. P. Bowles, L. Vanghan, N. G. Hingorani, CIGRE 1976, 13-09.

Accordingly, a HVDC load breaker would be required as the residual-current switch for commutating a current from the high-voltage line to the ground electrode line. However, this solution is expensive and uneconomical.

It is accordingly an object of the invention to avoid the hereinaforementioned shortcomings of devices of this general type, and to provide a simple and economically justifiable method of taking a HVDCTS station pole out of service without the need of using an expensive HVDC load breaker.

With the foregoing and other objects in view, there is provided in accordance with the invention a method of taking a pole of a high-voltage d-c transmission system (HVDCTS) out of service, having a rectifier station connected to a first three-phase network and an inverter station connected to a second three-phase network, two d-c lines connected from one station to the other, each station being divided into halves, the station halves of each station being connected together on one side to a station center grounding electrode, the other side of each station being connectible to the positive d-c line so as to form a positive pole, and to the negative d-c line so as to form a negative pole, and residual-current switching means for taking a pole out of service, which comprises grounding the station pole through a pole grounding switch which is spaced from the station center grounding electrode, and subsequently commutating a partial fault current of other poles, occurring from the pole being taken out of service, into the station center grounding electrode by the residual-current switch in the form of a three-phase power circuit breaker.

The advantages obtainable with this method invention are in particular that it becomes possible to use an ordinary three-phase power breaker. For instance, a compressed-air power circuit breaker as shown at page 5, line 3 of British Patent No. 1,151,854 may be used as the residual-current switch instead of the uneconomical HVDC load breaker, and only a relatively simple, coordinated control of the pole grounding switches, the residual-current switches and the line disconnect switches need be used.

In accordance with another mode of the invention, the method comprises grounding by means of pole grounding electrodes and residual-current switches at both ends of a pole, the rectifier and the inverter side, and subsequently disconnecting high voltage overhead lines or high voltage cables connecting the two ends, by disconnect switches.

Other features which are considered as characteristic for the invention are set forth in the appended claims.

Although the invention is illustrated and described herein as embodied in method of taking a pole of a high-voltage d-c transmission station out of service, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawing which is a circuit diagram for carrying out the method, of taking a pole of a HVDCTS out of service, of the invention.

The construction of such a HVDC system is known from ETZ-A, vol. 89, no. 8/9, and particularly from the Special Publication of the Working Group HVDCT, page 4; the reference symbols and their meaning are well known and therefore are given here in tabular form:
1—Converter Transformer
2—Three-phase Leads
3—Converter Group
4—Converter Valve
5—Converter Group
6—Bypass Switch
7—Bypass Switch
8—Station Pole
9—Station Center
10—Grounding Electrode Line
11—Station Center Grounding Electrode
12—Smoothing Chokes
13—Residual-Current Switch
14—Station Pole
15—Ground Return Line
18—Line Disconnect Switch
19—Rectifier Station
20—Inverter Station
21—High Voltage Line Referring now to the figure of the drawing, the method according to the invention provides for the use of a pole grounding switch 16, which is connected to an additional grounding electrode or station ground 17.

The two HVDCT stations 19 and 20 each include several station poles which are each connected through a common ground electrode or grounding switch. In the present embodiment, for instance, two station poles 8 and 14 are used. In the HVDC bi-pole system shown, station 19 operates as a rectifier station and station 20 as an inverter station. Through the three-phase leads 2, the converter transformer 1 feeds the converter group 3 (only one bridge of the group being shown here), which together with the converter group 5 forms the station pole 8. If a short to ground occurs in the three-phase leads 2 of the converter group 3 which is close to ground, then the return current $I_2$ of the still operative station pole 14 flows not only through the electrode line 10 to the station center grounding electrode 11, which may be a grounding switch, but also to the fault location through the last-current-carrying converter valve 4 of the half close to ground of the converter group 3 afflicted with the fault. In order to interrupt this so-called residual current $I_1$ by the valve control of the station pole 8 in question, the fault would have to be localized and the valves fired in a targeted manner. The apparatus required for this purpose is too expensive and unreliable, however, and it is therefore advisable to use a three-phase power circuit breaker as the residual current switch. Due to its arc voltage, the three-phase power circuit breaker is capable of cummutating the residual current $I_1$ from the fault location into the grounding electrode line 10. This method, which is known, is no longer applicable if there is no short to ground on the station side ahead of the smoothing choke 12 and if, furthermore, at the time of disconnecting the pole, the bypass switches 6 and 7 provided in the converter groups 3 and 5 are closed and therefore a path parallel to the ground return line 15 exists through the smoothing chokes 12 and the high-voltage line 21. Because of the high inductance of the circuit to be disconnected, a HVDC load breaker would have to be used as the residual-current switch 13 instead of the three-phase power circuit breaker.

This uneconomical solution is circumvented in a surprisingly simple manner, according to the method invention, by first grounding the station pole 8 separately by closing the pole grounding switch 16, before the residual current switch 13 is opened. It is assumed that the grounding electrode 11, which is connected to the station center 9, is physically spaced or removed far enough from the station ground or ground electrode 17 used for grounding the pole, so that both are connected to each other by reference ground only. By grounding the pole, the condition which exists on the valve side in the station in the event of a short to ground is intentionally brought about before the residual-current switch is opened. Thereby, the condition for actuating the residual-current switch, namely low inductance in the commutation circuit, is brought about. To finally cut off the station pole 8, it must further be disconnected from the high-voltage line 21. For this purpose, disconnect switches 18 are provided on the line side ahead of the smoothing chokes 12; these disconnect switches must be switched at zero current only. However, as long as both sides of a pole (rectifier side and inverter side) are not grounded and separated by the residual-current switches from the respective station centers, there is the possibility that a considerable partial fault current $I_3$ can still flow over the line. In a further embodiment of the invention, the procedure, after grounding has been effected, for disconnecting one pole side (e.g., the rectifier side 19) is similar for the other pole side (e.g., the inverter side 20) and only after the other station has reported back that that pole is grounded as well, and the residual-current switch there has been opened, is the release command for opening the line separators given.

There is claimed:

1. Method of taking a pole of a high-voltage d-c transmission system (HVDCTS) out of service, having a rectifier station connected to a first three-phase network and an inverter station connected to a second three-phase network, two d-c lines connected from one station to the other, each station being divided into halves, the station halves of each station being connected together on one side to a station center grounding electrode, the other side of each station being connectible to the positive d-c line so as to form a positive pole, and to the negative d-c line so as to form a negative pole, and a residual-current switch for taking a pole out of service being disposed between the station center and the respective station half, which comprises first grounding the station pole by closing a pole grounding switch which is spaced from the station center grounding electrode and is connected to the connection of the residual-current switch to the station pole, and subsequently commutating a partial fault current of other poles, occurring from the pole being taken out of service, into the station center grounding electrode by opening the residual-current switch in the form of a three-phase power circuit breaker.

2. Method according to claim 1 which comprises, after the pole grounding switch is closed and the residual current switch is opened in the station to be taken out of service, closing a pole grounding switch and opening a residual-current switch in another station, and thereafter opening a disconnecting switch to switch off the d-c circuit associated with this pole.

* * * * *